US008680972B2

(12) United States Patent
Quadri

(10) Patent No.: US 8,680,972 B2
(45) Date of Patent: Mar. 25, 2014

(54) STAGE-LIGHTING APPARATUS AND METHOD FOR CONTROLLING THE ORIENTATION OF A LIGHT BEAM EMITTED BY SAID APPARATUS

(75) Inventor: Pasquale Quadri, Torre De' Roveri (IT)

(73) Assignee: Clay Paky S.p.A., Seriate (IT)

( * ) Notice: Subject to any disclaimer, the term of this patent is extended or adjusted under 35 U.S.C. 154(b) by 395 days.

(21) Appl. No.: 12/991,637

(22) PCT Filed: May 8, 2009

(86) PCT No.: PCT/IB2009/005524

§ 371 (c)(1), (2), (4) Date: Mar. 10, 2011

(87) PCT Pub. No.: WO2009/136270

PCT Pub. Date: Nov. 12, 2009

(65) Prior Publication Data

US 2011/0149575 A1 Jun. 23, 2011

(30) Foreign Application Priority Data

May 9, 2008 (IT) .............................. MI2008A0847

(51) Int. Cl.
*G05B 11/01* (2006.01)

(52) U.S. Cl.
USPC ........................................................ 340/12.24

(58) Field of Classification Search
USPC .......... 340/12.24, 3.1, 549, 4.12; 362/523, 85
See application file for complete search history.

(56) References Cited

U.S. PATENT DOCUMENTS

| | | | | | |
|---|---|---|---|---|---|
| 5,502,627 | A | * | 3/1996 | Hunt et al. | 362/286 |
| 5,696,892 | A | * | 12/1997 | Redmann et al. | 345/582 |
| 5,890,793 | A | * | 4/1999 | Stephens | 362/225 |
| 6,346,783 | B1 | | 2/2002 | Belliveau | |
| 2004/0252486 | A1 | | 12/2004 | Krause | |

FOREIGN PATENT DOCUMENTS

| | | |
|---|---|---|
| JP | 03029296 | 2/1991 |
| WO | WO 91/08635 | 6/1991 |

OTHER PUBLICATIONS

PCT/IB2009/005524, Oct. 3, 2010, International Search Report and Written Opinion.

* cited by examiner

*Primary Examiner* — Vernal Brown
(74) *Attorney, Agent, or Firm* — Dorsey & Whitney LLP

(57) ABSTRACT

A stage-lighting apparatus is provided with: a light source adapted to generate a light beam; means for orienting the light beam; a remote driving station, which is located at a distance from the means for orienting the light beam and from the light source and has a driving handlebar, which is able to turn about a first axis and a second axis that are orthogonal to one another; a control unit, which is connected to the means for orienting the beam and to the remote driving station and is configured for controlling the means for orienting the light beam in such a way as to determine a movement of the light beam on the basis of a movement imparted to the driving handlebar.

14 Claims, 2 Drawing Sheets

STAGE-LIGHTING APPARATUS AND METHOD FOR CONTROLLING THE ORIENTATION OF A LIGHT BEAM EMITTED BY SAID APPARATUS

CROSS REFERENCE TO RELATED APPLICATIONS

This application is a U.S. Nationalization of PCT International Application No. PCT/IB2009/005524 filed 8 May 2009, entitled "STAGE-LIGHTING APPARATUS AND METHOD FOR CONTROLLING THE ORIENTATION OF A LIGHT BEAM EMITTED BY SAID APPARATUS," which claims priority to Italian Patent Application No. MI2008A000847 filed 9 May 2008, the entireties of both of the foregoing application are incorporated herein by reference.

TECHNICAL FIELD

Embodiments of the present invention relate to a stage-lighting apparatus and to a method for controlling the orientation of a light beam emitted by said apparatus.

Certain types of stage-lighting apparatuses, such as, for example, followspots, are controlled directly by an operator, who orients the followspot in such a way that the light beam emitted will light up one or more persons moving on a scene (for example, a personage on a stage or also on an athletics track).

However, it frequently occurs that the reduced spaces available in theatres or in television studios render positioning of the followspot very problematical. The followspot requires, in fact, a space sufficient to house the followspot and the operator, who must have a certain freedom of movement to be able to execute the operations of movement of the followspot in the best possible way.

BACKGROUND ART

Known in the art are stage-lighting apparatuses provided with a control device that executes an automatic recognition of the position of the actor and regulates the position of the light beam automatically so as to light up the actor on the scene. Said apparatuses do not require the presence of the operator in so far as control is performed in a completely automatic way, and consequently they can be positioned also in small spaces or even be suspended. However, lighting apparatuses of this type have not proven particularly effective and frequently, above all in the case of followspots, are unable to follow the movement of the actor properly.

SUMMARY

One or more embodiments of the present invention provide a stage-lighting apparatus that will be free from the drawbacks highlighted by the known art and, in particular, provide a simple and reliable control device.

An embodiment of the present invention relates to a stage-lighting apparatus comprising:

a light source adapted to generate a light beam;

means for orienting the light beam; and a remote driving station, which is located at a distance from the means for orienting the light beam and from the light source and is provided with a driving handlebar able to turn about a first axis and a second axis that are substantially orthogonal to one another;

the apparatus being characterized in that it comprises a control unit, which is coupled to the means for orienting the light beam and to the remote driving station and is configured to control the means for orienting the light beam in such a way as to determine a movement of the light beam on the basis of a movement imparted to the driving handlebar.

One or more embodiments of the present invention provide a method for controlling the orientation of the light beam emitted by a stage-lighting apparatus.

An embodiment of the present invention relates to a method for controlling the orientation of a light beam emitted by a stage-lighting apparatus comprising the step of manoeuvering a driving handlebar of a remote driving station, which is able to turn about a first axis and a second axis that are substantially orthogonal to one another;

the method being characterized in that it comprises the step of orienting the light beam emitted by the lighting apparatus on the basis of the movement imparted to the driving handlebar.

BRIEF DESCRIPTION OF THE DRAWINGS

Further characteristics and advantages of the present invention will emerge clearly from the ensuing description of a non-limiting example of an embodiment thereof, with reference to the figures of the annexed drawings, wherein.

DETAILED DESCRIPTION

Figure 1:
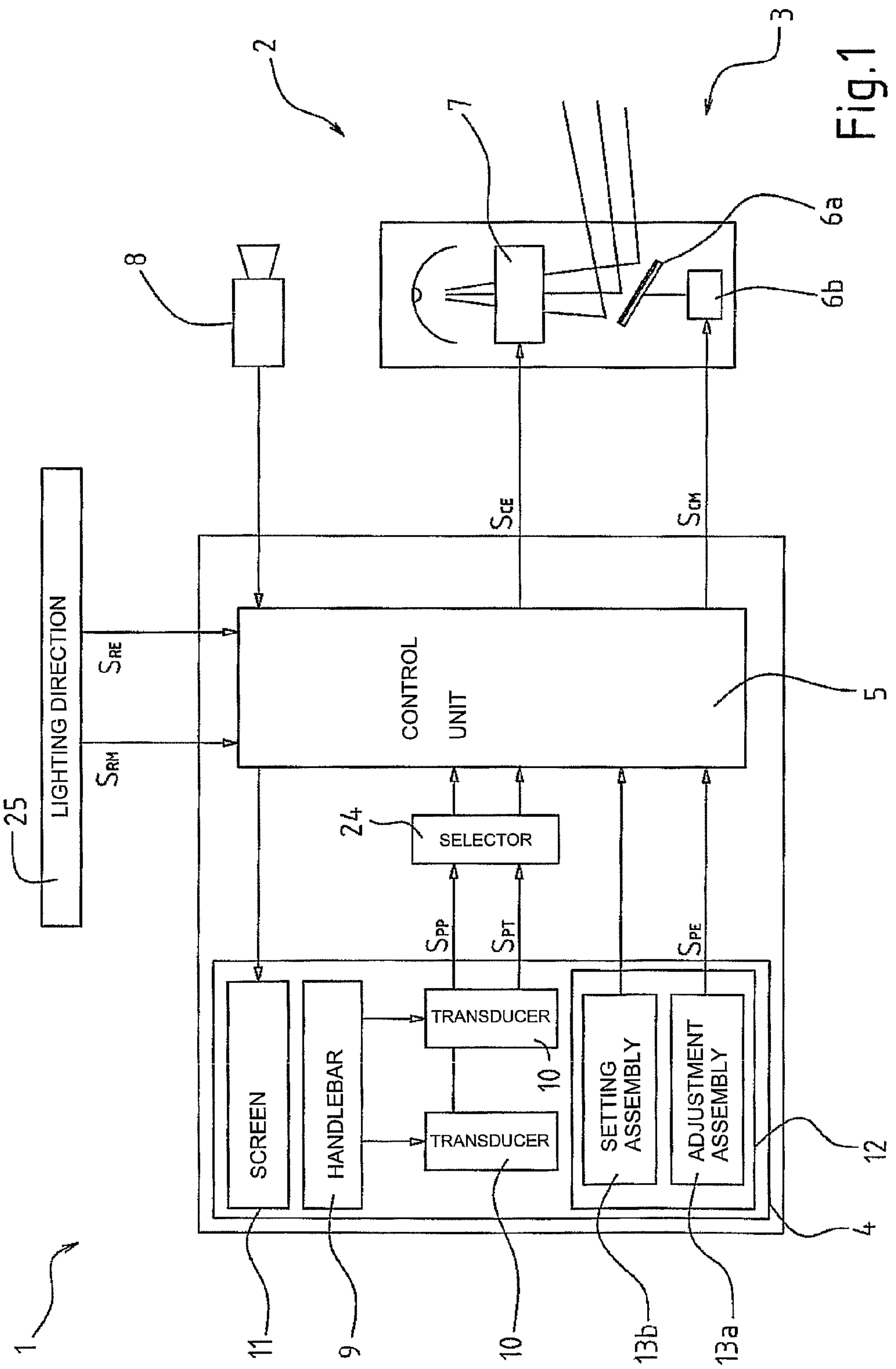
FIG. 1 is a schematic representation of the stage-lighting apparatus according to an embodiment of the present invention.

Designated by the reference number 1 in FIG. 1 is a stage-lighting apparatus comprising a light source 2 adapted to emit a light beam, means for orienting the light beam 3, a remote driving station 4, a control unit 5 connected to the remote driving station 4 and to the means for orienting the light beam 3, and a fixed video camera 8 for filming a scene adapted to be illuminated by the light beam.

In the non-limiting example described and illustrated herein, the light source 2 is a followspot and the means for orienting the light beam 3 comprise a mirror 6*a* set along the light beam emitted by the light source 2 to deflect it and means for movement 6*b* of the mirror 6*a*. The light source 2 further comprises at least one element for adjusting the effects 7 of the light beam, generally set along the light beam, such as, for example, a zoom, a dimmer, or a lens.

It remains understood that the light source 2 can be a projector of any type capable of generating a light beam.

The remote driving station 4 receives the commands imparted by the operator and converts them into driving signals to be supplied to the control unit 5. The remote driving station 4 can be located in any position with respect to the light source 2, provided that the light source 2, the control unit 5, and the remote driving station 4 are in communication with one another according to any data-transmission mode.

In particular, the remote driving station 4 comprises a driving handlebar 9, at least two position transducers 10, a screen 11, and an interface 12, which comprises an adjustment unit 13*a* and a setting unit 13*b*.

Figure 2:
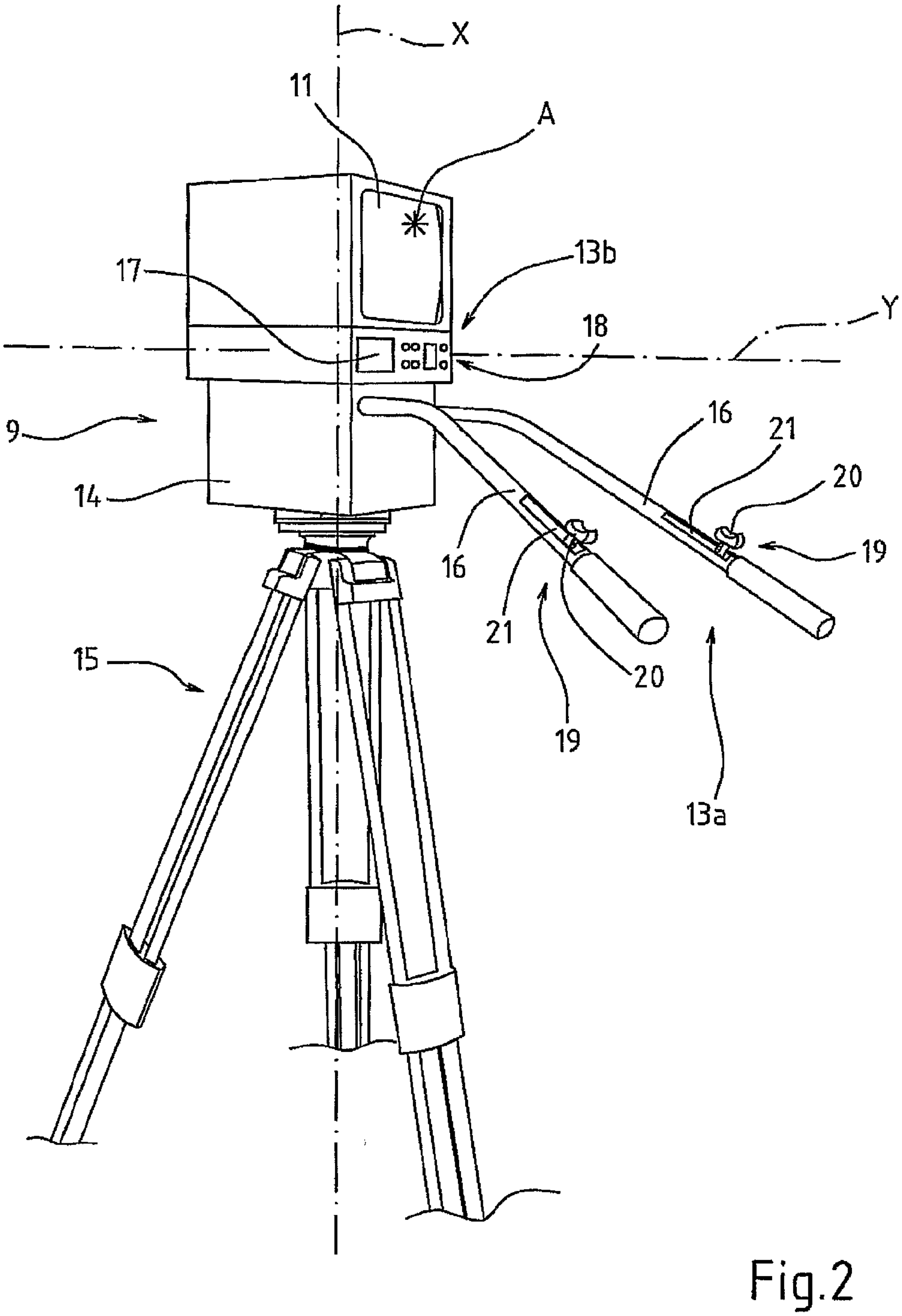
FIG. 2 is a perspective view, with parts removed for reasons of clarity, of a detail of the apparatus of FIG. 1.

With reference to FIG. 2, the driving handlebar 9 comprises a main body 14, which is supported by a tripod 15 and is provided with two gripping bars 16, which extend in divergent directions from the main body 14. The main body 14 is able to turn about at least two axes X and Y orthogonal to one another, a PAN axis and a TILT axis, respectively, upon command by the operator, who by gripping the gripping bars 16 determines the position of the main body 14.

With reference to FIG. 1, each position transducer 10 (more commonly referred to as "encoder") is able to generate a position signal $S_{PP}$, $S_{PT}$, which indicates the angular position assumed by the main body 14 (FIG. 2) of the driving handlebar 9 with respect to the axes X and Y. In the non-limiting example described and illustrated herein, the position transducers 10 are of the incremental type.

The screen 11 shows the images detected by the fixed video camera 8. In the example described and illustrated herein, the video camera 8 is of a traditional type. A variant embodiment of the present invention envisages the use of an infrared video camera able to show the scene even in conditions of practically total darkness.

Shown moreover on the screen 11 is the position of the projection of the light beam emitted by the light source 2 with respect to the scene filmed by the video camera 8 by means of an indicator A, for example a cross (FIG. 2). The position of the indicator A, and hence of the projection of the light beam, is calculated by the control unit 5 on the basis of the position signals $S_{PP}$, $S_{PT}$ and is appropriately corrected on the basis of calibration parameters that are pre-defined and can be set by the operator by means of the setting unit 13*b* of the interface 12.

A variant envisages that the control unit 5 will calculate the position of the visual indicator A on the basis of a detected position of the mirror 6*a*. Also in this case corrections of the calculation of the position are envisaged on the basis of pre-defined calibration parameters.

The setting unit 13*b* of the interface 12 enables the operator to vary the setting parameters and/or select different operating modes, etc. For example, the operator can regulate, in the installation step, the values of a parameter for compensating the non-linear path of the projection of the light beam, which arises for geometrical reasons when the driving handlebar 9 is rotated only about the axis X, i.e., the PAN axis.

The operator can moreover set the ratio of proportionality of movement between the driving handlebar 9 and the mirror 6*a*. If the ratio of proportionality is 1:1, to a displacement of the driving handlebar 9 there corresponds an equal displacement of the mirror 6*a* and hence of the light beam. If the ratio of proportionality is, for example, 4:1, to a given displacement of the driving handlebar 9 there corresponds a displacement of the mirror 6*a* that is four times smaller. A ratio of proportionality of this type is very useful in situations where the light source 2 is set at a large distance from the scene, and, consequently, to a small displacement of the mirror 6*a* there corresponds a large displacement of the light beam projected on the scene.

With reference to FIG. 2, the setting unit 13*b* of the interface 12 described and illustrated herein comprises a display 17, for example of an LCD type, and some buttons 18.

With reference to FIG. 1, the adjustment unit 13*a* is configured for generating a signal for adjusting the effects of the light beam $S_{PE}$. Said signal for adjusting the effects of the light beam $S_{PE}$ regulates the action of at least one element for adjusting the effects 7 of the beam of the light source 2.

With reference to FIG. 2, the adjustment unit 13*a* comprises a plurality of control elements 19, for example knobs or sliders, each of which is adapted to regulate a respective element for adjusting the effects 7 of the light beam. In the non-limiting example illustrated and described herein, the adjustment unit 13*a* comprises at least two control elements 19, each of which is provided with a slider 20 that is able to slide in a guide 21 provided along a respective gripping bar 16 of the driving handlebar 9, and a linear potentiometer (not illustrated) associated to the slider 20 and adapted to generate a signal for adjusting the effects of the light beam $S_{PE}$.

A variant (not illustrated) envisages that the adjustment unit 13*a* further comprises one or more control elements arranged in the proximity of the buttons 18 of the setting unit 13*b*.

Basically, the operator is able to regulate from the remote driving station 4 both the position and the characteristics of the light beam emitted by the light source 2.

With reference to FIG. 1, the remote driving station 4 further comprises a selector 24, which can be activated for example with a pedal command, which temporarily disables the driving handlebar 9, for example by disconnecting it from the control unit 5. The selector 24 enables the operator to move the driving handlebar 9 without bringing about any movement of the mirror 6*a*. Said function is used in situations in which it is necessary to align the position of the beam with that of the driving handlebar 9, or else in situations in which it is necessary to reset the position of the driving handlebar 9.

The control unit 5 receives at its input the position signals $S_{PP}$, $S_{PT}$ coming from the respective position transducers 10 and the signals $S_{PE}$ coming from the adjustment unit 13*a* and the settings coming from the setting unit 13*b*.

The control unit 5 moreover receives at its input signals for adjusting the orientation of the light beam $S_{RM}$ and signals for adjusting the effects of the light beam $S_{RE}$ coming from a lighting direction 25.

On the basis of the input signals, the control unit 5 sends a movement-control signal $S_{CM}$ to the means for movement 6*b* of the mirror 6*a* and a signal for controlling the effects of the beam $S_{CE}$ to the elements for adjusting the effects 7 of the light beam.

In particular, the signals coming from the remote driving station 4 are corrected on the basis of the signals coming from the lighting direction 25, in so far as the regulation imparted by the lighting direction 25 is considered more important than the manual regulation imparted by the driving station 4.

The position signals $S_{PP}$, $S_{PT}$, the signal for adjusting the effects of the beam $S_{PE}$, the signals for adjusting the orientation of the light beam $S_{RM}$, the signals for adjusting the effects of the light beam $S_{RE}$, the movement-control signal $S_{CM}$, and the signal for controlling the effects of the light beam $S_{CE}$ are preferably transmitted according to the DMX512 protocol.

Embodiments of the present invention afford the following advantages.

In the first place, the stage-lighting apparatus according to embodiments of the present invention guarantees a remote manual control of the orientation of the light beam that is reliable and effective. This type of remote control enables location of the light source 2 even in positions inaccessible to or inconvenient for an operator. In addition, the presence of the screen 11, which shows the images acquired by the fixed video camera 8 thanks to which it is possible to follow the position of the projection of the light beam, enables location of the remote driving station 4 even in a position in which the scene is not visible by the operator.

Above all, the fact that the driving handlebar 9 has a mode of use that is very similar to that of traditional handlebars for driving followspots and the fact that the displacement brought about by the operator corresponds to a proportional displacement of the light beam is particularly advantageous for a normal operator, who does not have to be purposely trained for use of the lighting apparatus 1. With the lighting apparatus 1, in fact, the mode of operation by the operator is substantially identical to the mode of operation with a followspot with direct control.

Finally, it is evident that modifications and variations may be made to the apparatus and to the method described herein, without thereby departing from the scope of the annexed claims.

The invention claimed is:

1. A stage-lighting apparatus comprising:

a light source adapted to generate a light beam;

means for orienting the light beam;

a remote driving station including a driving handlebar that is located at a distance from the light source and from the means for orienting the light beam, the driving handlebar able to turn about a first axis and a second axis that are substantially orthogonal to one another; and a control unit, which is coupled to the means for orienting the light beam and to the remote driving station, the control unit configured to control the means for orienting the light beam in such a way as to determine a movement of the light beam responsive to movement imparted manually to the driving handlebar.

2. The apparatus according to claim 1, wherein the remote driving station comprises at least two position transducers, for generating each a position signal that indicates the position of the driving handlebar with respect to a respective one between the first axis and the second axis; the position signals being supplied to the control unit.

3. The apparatus according to claim 2, further comprising a fixed video camera for filming a scene that is to be lit up by the light beam.

4. The apparatus according to claim 3, wherein the remote driving station comprises a screen for displaying images acquired by the video camera.

5. The apparatus according to claim 4, wherein the control unit is configured for determining a position of a projection of the light beam with respect to the scene filmed by the video camera and is moreover coupled to the screen for displaying an indicator corresponding to the position of the projection of the light beam.

6. The apparatus according to claim 5, wherein the control unit is configured for calculating the position of the projection of the light beam on the basis of the position signals that indicate the angular position of the driving handlebar with respect to the first and second axes.

7. The apparatus according to claim 5, wherein the control unit is configured for calculating the position of the projection of the light beam on the basis of a detected position of the light beam.

8. The apparatus according to claim 1 wherein the driving handlebar comprises a main body, which is supported by a tripod and is provided with two gripping bars, which extend from the main body; the main body being able to turn about the first and second axes.

9. The apparatus according to claim 1 remote driving station comprises at least one adjustment unit, configured for generating at least one signal for adjusting the effects of the light beam; said signal for adjusting the effects of the light beam regulating the action of at least one element for adjusting the effects of the light beam.

10. At least one apparatus according to claim 9, wherein the adjustment unit comprises at least one control element provided with a potentiometer for generating the signal for adjusting the effects of the light beam.

11. The apparatus according to claim 1, wherein the remote driving station comprises a selector adapted to disconnect the driving handlebar temporarily from the control unit.

12. A method for controlling the orientation of a light beam emitted by a stage-lighting apparatus comprising:

manually maneuvering a driving handlebar of a remote driving station, which is able to turn about a first axis and a second axis that are substantially orthogonal to one another; and orienting the light beam emitted by the stage-lighting apparatus responsive to the movement imparted to the driving handlebar by the manually maneuvering the driving handlebar.

13. A stage-lighting apparatus, comprising:

a light source configured to generate a light beam;

an optical structure configured to orient the light beam;

a remote driving station including a driving handlebar configured to turn about a first axis and a second axis that are substantially orthogonal to one another, the driving handlebar located a distance from the light source and the optical structure; and a control unit that is coupled to the optical structure and to the remote driving station, the control unit configured to control the optical structure to determine a movement of the light beam responsive to movement imparted manually to the driving handlebar.

14. The apparatus according to claim 13, wherein the optical structure comprises at least one mirror.

* * * * *